United States Patent [19]

Boram

[11] Patent Number: 4,641,240

[45] Date of Patent: Feb. 3, 1987

[54] ELECTRONIC VOTING MACHINE AND SYSTEM

[75] Inventor: Robert J. Boram, Quakertown, Pa.

[73] Assignee: R. F. Shoup Corporation, Bryn Mawr, Pa.

[21] Appl. No.: 608,157

[22] Filed: May 18, 1984

[51] Int. Cl.[4] ........................ G06F 15/20; G07C 13/00

[52] U.S. Cl. .................................. 364/409; 235/54 F; 235/51; 434/306

[58] Field of Search ......................... 364/409; 434/306; 235/51, 50 R, 50 A, 50 B, 54 R, 54 A, 54 B, 54 C, 54 D, 54 E, 54 F, 56

[56] References Cited

U.S. PATENT DOCUMENTS

| | | | |
|---|---|---|---|
| 3,648,022 | 3/1972 | Cook | 235/61.9 R |
| 3,743,177 | 7/1973 | Martin et al. | 235/51 |
| 3,941,976 | 3/1976 | Huhn | 235/54 F |
| 3,947,669 | 3/1976 | Simmons et al. | 364/409 X |
| 4,015,106 | 3/1977 | Phillipo | 235/54 F |
| 4,021,780 | 5/1977 | Narey et al. | 235/54 F X |
| 4,025,757 | 5/1977 | McKay et al. | 235/54 F |
| 4,046,992 | 9/1977 | Huhn et al. | 235/54 F |
| 4,066,871 | 1/1978 | Cason, Sr. et al. | 235/54 F |
| 4,178,501 | 12/1979 | Luther | 235/54 F |
| 4,227,643 | 10/1980 | Luther | 235/54 F |
| 4,345,315 | 8/1982 | Cadotte et al. | 235/54 F X |

*Primary Examiner*—Gary V. Harkcom
*Attorney, Agent, or Firm*—Woodcock, Washburn Kurtz Mackiewicz & Norris

[57] ABSTRACT

An electronic voting system in which a programmable electronic voting machine is personalized by the addition of a ballot sheet and a memory cartridge containing signals output by a computer device operated by election officials in preparing for an election. A corresponding ballot is similarly printed by the computer device. The memory cartridge is arranged to be used to carry the final totals back to a computer at election headquarters for totalization and outputting of the election results. Circuitry is included within the system for insuring election security, for providing absentee balloting and for permitting write in voting.

21 Claims, 7 Drawing Figures

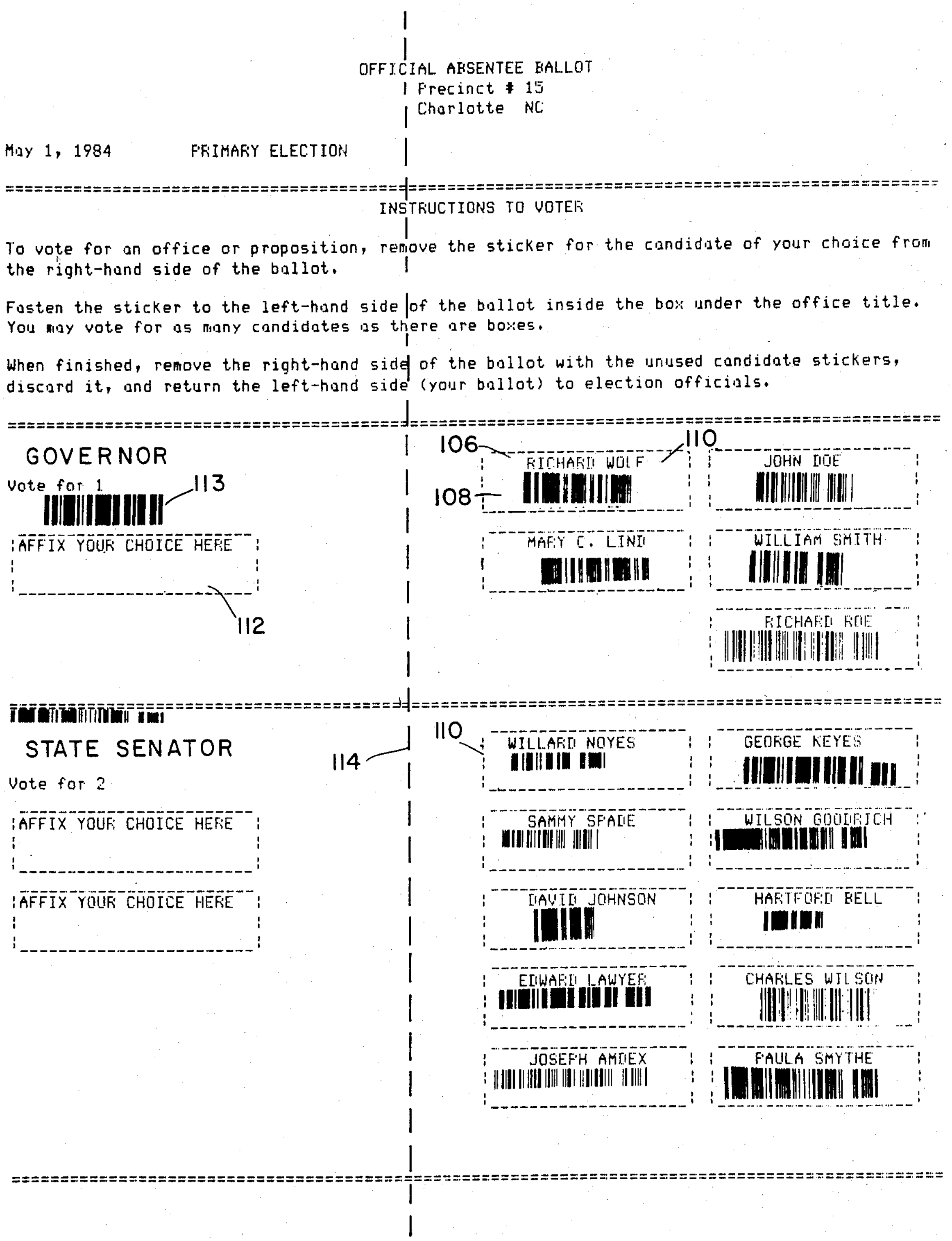
OFFICIAL ABSENTEE BALLOT
Precinct # 15
Charlotte NC

May 1, 1984 PRIMARY ELECTION

INSTRUCTIONS TO VOTER

To vote for an office or proposition, remove the sticker for the candidate of your choice from the right-hand side of the ballot.

Fasten the sticker to the left-hand side of the ballot inside the box under the office title. You may vote for as many candidates as there are boxes.

When finished, remove the right-hand side of the ballot with the unused candidate stickers, discard it, and return the left-hand side (your ballot) to election officials.

GOVERNOR
Vote for 1
AFFIX YOUR CHOICE HERE

RICHARD WOLF
JOHN DOE
MARY C. LIND
WILLIAM SMITH
RICHARD ROE

STATE SENATOR
Vote for 2
AFFIX YOUR CHOICE HERE
AFFIX YOUR CHOICE HERE

WILLARD NOYES
GEORGE KEYES
SAMMY SPADE
WILSON GOODRICH
DAVID JOHNSON
HARTFORD BELL
EDWARD LAWYER
CHARLES WILSON
JOSEPH AMDEX
PAULA SMYTHE

Fig. 7

ELECTRONIC VOTING MACHINE AND SYSTEM

FIELD OF THE INVENTION

This invention relates to an electronic voting machine and system. More particularly, the invention relates to a voting system including a programmable electronic voting machine, which is adaptable to be used in a wide variety of elections, and which offers numerous advantages both with respect to the integrity of the election and the ease of set up and maintenance of the voting machine as compared to the prior art.

BACKGROUND OF THE INVENTION

Voting for candidates for public office in the United States has largely been carried out by use of mechanical voting machines. Typically the voter moves a metal switch member to indicate that he desires to vote for a particular candidate. When he is concluded setting the switches, he moves a lever which makes a permanent record of his votes, resets the switches and opens a curtain which had provided privacy. In cases where the voter may only vote for a limited number of candidates for a particular office, mechanical interlock devices are provided to insure that the voter cannot set more than the correct number of switches. Means have also been provided to provide a mechanical indication that a "write-in" vote was desired by the voter and means for associating the written in vote with votes of a particular voter.

While such mechanical voting machines have not been without utility, there are several drawbacks to their use. Primary is that of cost; the mechanical machines now in use would be expensive to replace. Most of the mechanical machines now in use were manufactured several decades ago and are now substantially worn out and are not now being manufactured, such that there is a present need for a less expensive voting machine. Secondly, the prior art mechanical voting machines have been relatively complicated and expensive to set up for a particular election, and require substantial mechanical maintenance such as oiling, replacement of worn parts and the like. Furthermore, the prior art mechanical machines are heavy and cumbersome to move from a warehouse to a polling place in preparation for an election. Typically these machines require relatively complex multi-part paper ballots to be printed. Preparation of ballots is a very expensive and time consuming process in the prior art, according to which ballots are designed by hand and printed by conventional offset printing processes.

Further, as will be appreciated by those skilled in the art, it is always desirable to improve the security of the election process and provide improved accuracy and versatility in the electoral process.

OBJECTS OF THE INVENTION

It is therefore an object of the invention to provide a substantially non-mechanical voting machine which can be relatively simply set up for any particular election.

It is a further object of the invention to provide a non-mechanical voting machine in which a single sheet of paper is used as a ballot.

It is a further object of the invention to provide an electronic voting system in which a voting machine is set up for a particular election by receiving signals from a computer controlled by the election organizing committee, in which this computer is also used to generate the ballot so that the paper ballot matches the signals given to the voting machine in a convenient fashion.

It is a further object of the invention to provide an electronic voting machine which is at once easier to set up for an election and provides a more secure election result than is possible in the prior art.

A further object of the invention is to provide an electronic voting machine which is less expensive, simpler to maintain, lighter in weight, and which provides improved security and additional versatility as compared with prior art mechanical voting machines.

SUMMARY OF THE INVENTION

The above needs of the art and objects of the invention are met by the present invention which comprises an electronic voting machine which has as a major component a array of substantially identical switches which are assigned by microprocessor circuitry to be associated with particular candidates for corresponding offices. The microprocessor is instructed to associate particular offices with particular candidates by signals supplied from a memory cartridge programmed by a computer. The computer is programmed by election officials to print a ballot, and to supply signals to the memory cartridge. The memory cartridge is physically inserted into the voting machine. The signals stored therein instruct the microprocessor to associate the appropriate switches with the individual candidates corresponding to the candidates positions on the ballot, which overlays the array of switches. The electronic voting machine then maintains totals of the votes cast for each of the candidates. The microprocessor is similarly supplied with signals concerning any election restrictions, such as the number of candidates for a particular office which can be voted for by a particular voter, and ensures that these rules are followed.

In the preferred embodiment, two different kinds of memory are comprised in the memory cartridge, electrically erasable read only memory (EEROM) and erasable programmable read only memory (EPROM). The EEROM, which may be duplicated for reliability purposes, contains a running total of the votes cast for each candidate. These totals are compared with similar totals carried in memory arrays contained in the electronic voting machine. When the voting has been concluded on a particular day, the tallies are then copied to the EPROM, which is of the type to which data can only be written after erasure of the ROM by supply of ultraviolet light or other non-electrical erasing means thereto. The memory cartridge also contains a fuse, connected in series to the WRITE ENABLE signal line leading to the EPROM, such that once the fuse is blown, e.g. by the programmable voting machine of the invention at the conclusion of a day's voting, the data stored in the EPROM cannot be altered thereafter without replacement of the fuse. The memory cartridge is contained within a sealed opaque housing such that the fuse cannot be replaced without detectable opening of the housing. Similarly, the housing must be opened to erase the EPROM. Both measures provide additional security to the voting process. Additionally, checksum digits are generated and stored in the memory cartridge for both the electronic voting machine set up instructions and for the results totals, thereby providing additional, electronic security to the voting process. Additional aspects, objects and advantages of the invention will appear to those skilled in the art from the discussion below.

BRIEF DESCRIPTION OF THE DRAWINGS

The invention will be better understood if reference is made in the accompanying drawings in which:

FIG. 7 shows some details of an absentee or replacement ballot, forming a portion of the system of the invention.

DESCRIPTION OF THE PREFERRED EMBODIMENTS

Figure 1:
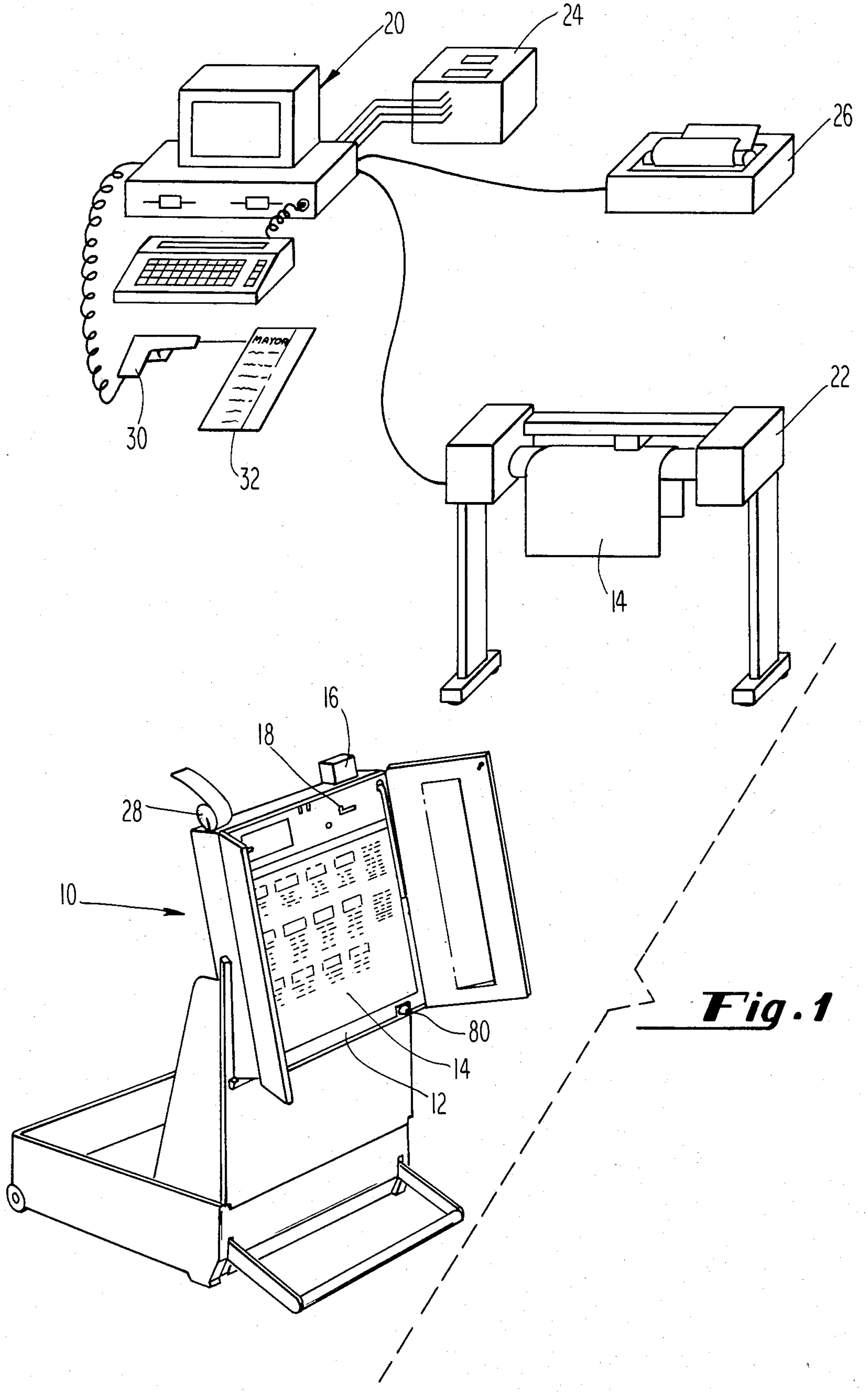
FIG. 1 shows an overview of a voting system according to the invention.

FIG. 1 shows an overall view of the electronic voting system according to the invention. An electronic voting machine 10 is provided as an essential part of the system of the invention. It comprises a number of substantially identical push button type switches on a front panel 12 which is overlayed by a paper ballot 14 when the machine is set up for a particular election. The paper ballot thus indicates to the voter which switch is associated with a particular candidate for office. The switches are effectively correspondingly personalized by insertion of a memory cartridge 16 which is generated by election officials utilizing a personal computer system 20 or the equivalent. Similarly, the ballot 14 is printed by a printer 22, controlled by the personal computer device 20 operated by the election officials in preparation for a given election.

In this way, the electronic voting machine according to the invention, which comprises means for receiving signals carried by the memory cartridge is effectively set up for an election simply by inserting a single ballot paper 14 and a memory cartridge 16. This is in contrast to numerous complex and time consuming mechanical operations required to set up the prior art mechanical voting machines for a particular election. Supply of the single paper ballot 14 is a considerable improvement in itself. Typically, prior art mechanical voting machines required the correct insertion of a large number of paper ballots each of which had to be separately designed and printed.

As shown in FIG. 1 the printer 22 used to print the ballot paper may typically be the sort of printer used for producing large scale circuit or architectural diagrams or the like. Such printers are readily available in the prior art. An example which is successfully used with the particular embodiment of the invention to be detailed below is sold by the Hewlett-Packard Company under Model No. 7585B.

Personal computer 20 may comprise any one of a large number of computers now readily available and easily programmable by those skilled in the art to perform the functions mentioned. For example, the IBM "PC" personal computer was used in one successfully tested embodiment. This computer can readily be adapted to provide additional functions indicated in FIG. 1. For example, the memory cartridge 16 comprises a number of programmable read only memories of varying types discussed in detail below. These are programmed, i.e., signals generated by the personal computer 20 are written more or less permanently to the PROM's, by a conventional PROM programmer/-reader device 24. As is well understood by those skilled in the art, PROM's are written by supplying an address to a first group of signal lines of the PROM, applying data to appropriate data lines and then applying a WRITE ENABLE pulse to a specific control line. At that point, the data on the data lines is written to the address in the PROM's memory array specified on the address lines. Thereafter, upon accessing of the same address, and supplying a READ ENABLE pulse, the data thus stored can be read out over a number of predetermined output data lines, which may or may not be the same as the input data lines. All this is well known in the art and forms no part of the present invention except insofar as a memory cartridge is used to program an electronic voting machine.

Upon preparing for a particular election, then, election officials access the personal computer in the conventional fashion and input the names of the various candidates together with the offices for which they are standing and any legal restrictions on voting. For example, in a complex city council election, an individual voter in a particular district may be able to select one of two or three candidates for representative of his own councilmanic district as well as five out of fifteen candidates for at-large council seats. This information could accordingly be input into the personal computer 20. It then prints typically on a second printer 26, a "proof copy" of the ballot, that is, indicating the association of the candidates with their offices and the corresponding legal requirements, together with any party affiliations, ward affiliations or the like, so as to insure that the data has all properly been entered into the computer 20. Any necessary corrections can then be made. Once the ballot has been finalized, the printer 22 can be controlled to print the ballot in a manner understood by those skilled in the art, by a number of printer command signals supplied by the personal computer 20. Similarly, a memory cartridge can be inserted in a conventional socket in the PROM programmer/reader 24 and the corresponding signals can be stored therein for programming the programmable voting machine 10. Thereafter the ballot 14 and the memory cartridge 16 are carried to the polling place and inserted into the programmable voting machine 10. The programmable voting machine comprises a microprocessor or central processor unit, which is adapted to read the signals carried by the PROM's in the memory cartridge 16 in a manner well understood by those skilled in the art and detailed below, and which thereafter assigns individual ones of the array of switches carried on the front panel of the machine 12 to a given candidate. The microprocessor also comprises memory means for storage of the tallies of the votes corresponding to each of the switches, i.e. the vote totals entered for each candidate. Accordingly, it can be seen that the memory cartridge 16 assigns individual ones of the switches to candidates as far as the machine is concerned, whereas the ballot 14 assigns individual switches to individual candidates as far as the voter is concerned. In this way, the programmable voting machine 10 can conveniently be "personalized" or "set up" for a particular election. Accurate correspondence between the data supplied to the voting machine 10 by the memory cartridge 16 and to the votes by the ballot 14 is simplified by having the computer 20 produce both.

At the conclusion of the day's voting, the tallies of the votes cast for each candidate are copied back to the PROM's carried by memory cartridge 16 in a manner detailed below, and the cartridge is then carried back to election headquarters for totalization by the personal computer 20. The electronic voting machine 10 is also provided with a printer device, typically a simple dot matrix paper tape printer 28, which provides a visually readable history of the election day events. For example, the paper tape printer can be controlled to indicate when the polls were opened, when any write in votes were entered, so as to ensure that no individual voter voted more than the legal maximum per office, whether any repairs were required or effected on the voting machine 10, and the like.

Those skilled in the art will recognize that one problem which is faced in elections is that of absentee ballots. This is required when a registered voter is unable to be physically at the polling place at the time of the election but wishes to vote regardless. In the preferred embodiment of the invention, absentee ballots are provided with bar coded removable adhesive labels for the individual candidates for each office. These too can be printed under the control of computer 20 by printer 26 and supplied individually to each of the eligible absentee voters. The voter removes the labels corresponding to the candidates he favors and sticks them to the ballot in a position corresponding to the office. A conventional bar code scanner device 30 can then be provided at election headquarters for inputting the bar code data from the bar coded absentee ballots 32. The absentee ballots can be provided with adequate means to insure their security in a manner discussed below, which forms the subject of copending application Ser. No. 608,158, filed May 8, 1984, now abandoned, and its continuation application Ser. No. 770,053, filed Aug. 27, 1985, both of which are incorporated herein by reference.

Figure 2:
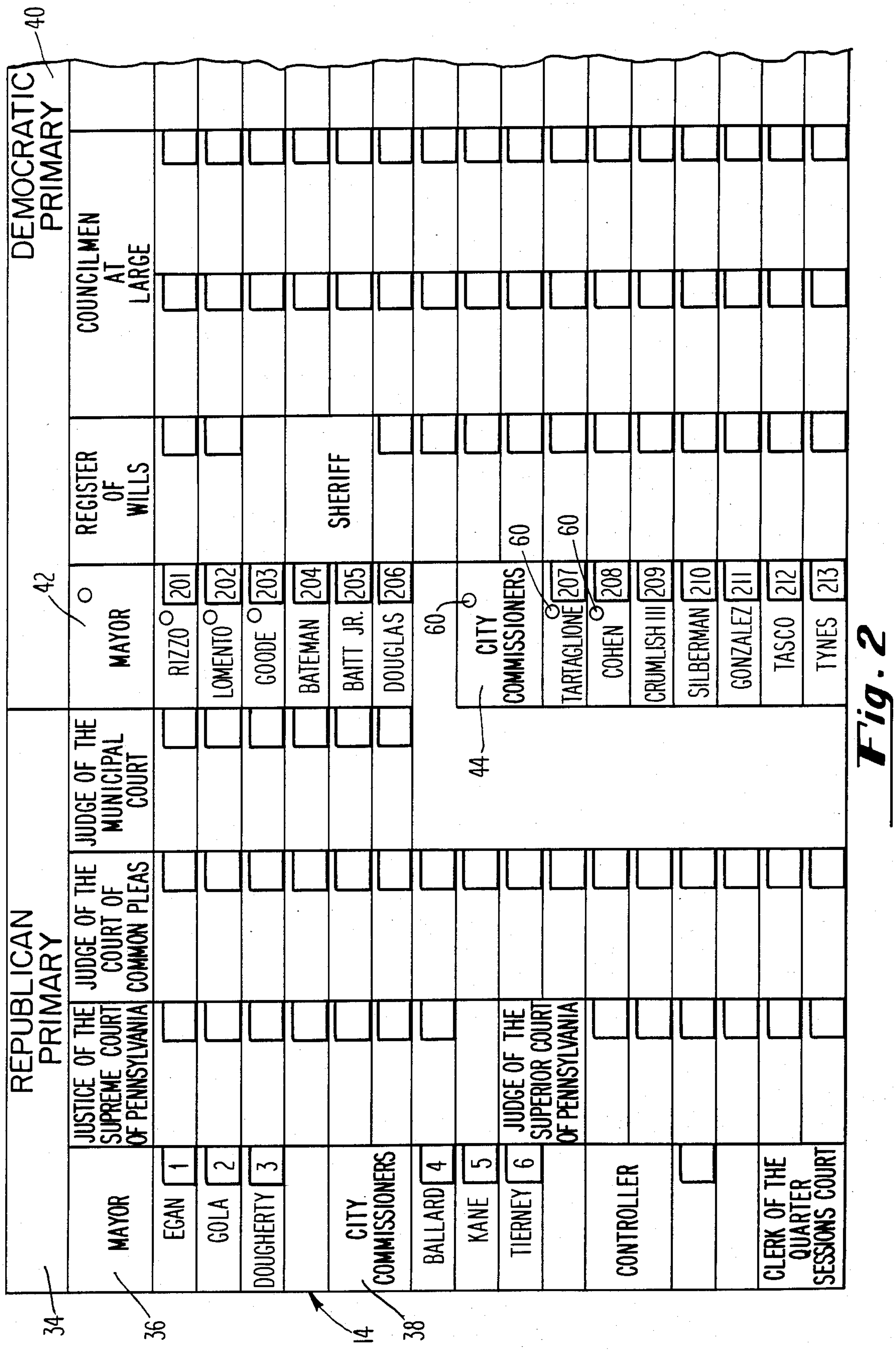
FIG. 2 shows a portion of a ballot printed by the system of the invention and in accordance therewith.

FIG. 2 shows a sample ballot 14 generated by a printer such as 22 in FIG. 1. The ballot shown is for the Philadelphia Primary Election of 1983. Accordingly, a number of candidates are listed under party affiliations 34 and 40; for example, Republican candidates for Mayor are listed under box 36, Democratic candidates for Mayor at 42; the ballot is broken into Republican and Democratic sections 34 and 40, respectively. Similarly, there are a large number of candidates for city commissioner listed at 38 and 44. As can be observed, the ballot indicates to the voter how many candidates he may vote for for each particular office; for example, only one mayoral candidate can be voted for by a given voter. As can be observed from the ballot 14, the numbered "buttons", which are pressed by the voter to vote for a particular candidate, are regularly spaced. This spacing corresponds of course to the spacing of the individual switches on the front panel of programmable voting machine 10. Typically the ballot is paper which is relatively flexible and is overlayed with a clear flexible material to protect the ballot paper from being dirtied or defaced during the voting process. Both these materials have sufficient "give" that the voter can simply press them down to actuate the corresponding button. The central processing unit of the electronic voting machine then records the vote and can prevent any additional votes for that office being entered if the voter has voted for the correct number. Similarly, if in a primary election the voting official has indicated that the voter is a member of one of the leading parties he or she is prevented from voting for candidates run by the other parties. Not shown on the ballot of FIG. 2 is a place for write in votes; typically this is simply an extra space on the paper ballot corresponding to a switch which is depressed by the voter when he or she wants to enter a write in vote. Pressing the button opens a window 18 (FIG. 1) on the front panel of the electronic voting machine. The voter can then write the name of the candidate in the window 18 and close the window, thus sealing it from view from any subsequent voter. Typically, the time at which this occurrence takes place will be noted on the paper tape record outputted by printer 28 so as to provide additional election security.

Figure 3:
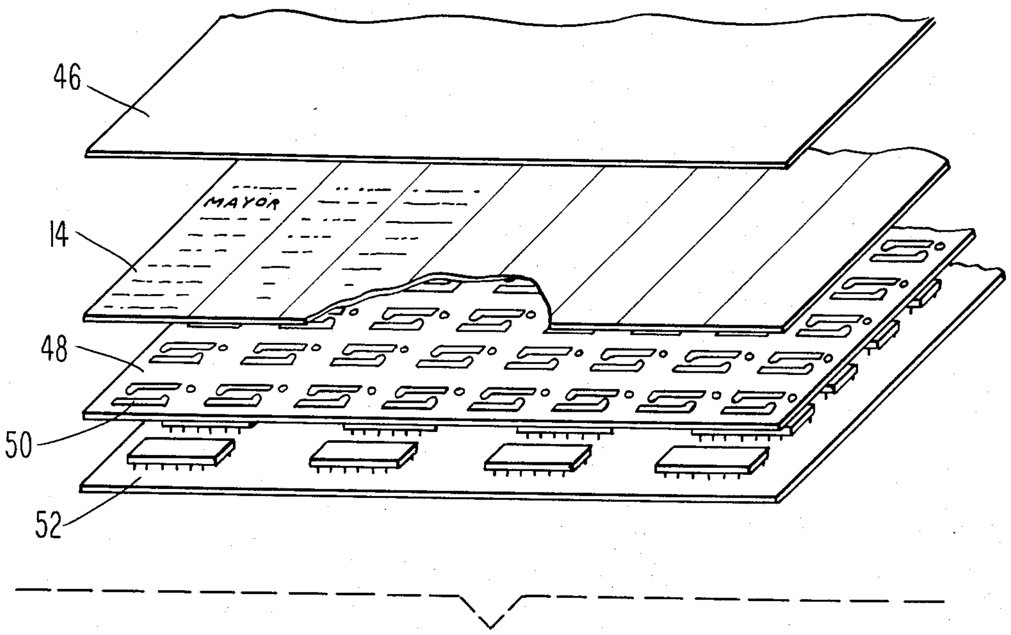
FIG. 3 shows a three dimensional, partly cut-away view of the structure of the keyboard of the voting machine of the invention.

FIG. 3 shows an exploded perspective view of an exemplary construction of the front panel of the machine 12. The ballot 14 is interposed between a layer of clear protective material 46 typically "Lexan" or similar material and a planar array 48 of regularly spaced switch elements 50 mounted on a circuit board 52 which contains various components necessary to support the functions required. Typically the complete switch array will be made up of six identical "matrix modules" for convenience in construction.

Figure 4:
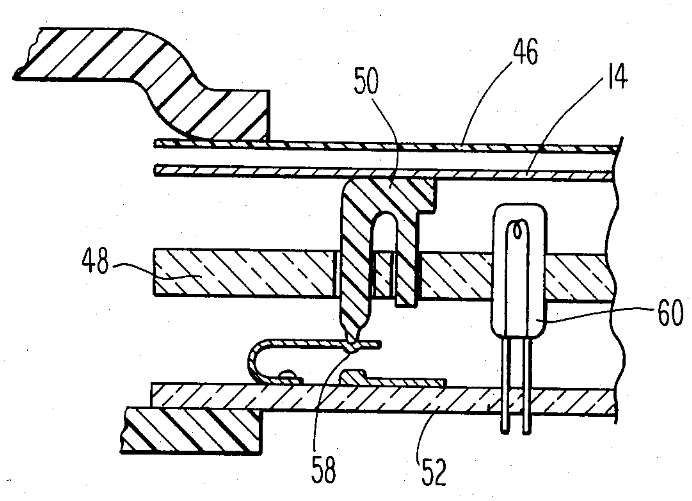
FIG. 4 is a cross-sectional view of the keyboard of the voting machine of the invention showing additional details of the switching structure.

FIG. 4 shows an exemplary cross-section of the the keyboard; the Lexan layer 46 is shown spaced from the ballot paper 14 for clarity, as ordinarily they would be in contact. A single switch element 50 of the array 48 of movable switch elements is shown, which will cause electrical contacts 58 to contact one another upon being depressed. These are mounted on the circuit board 52. Also mounted on the circuit board 52 is a light emitting diode (LED) 60 or the equivalent; the LED's juxtaposed to office titles can be illuminated or blink when a voter has not exhausted the number of votes he is entitled to cast for a particular office. Thus, in the ballot shown in FIG. 2 an LED in the block 44 marked "Democratic City Commissioner" would be illuminated, glowing through the ballot paper and Lexan sheet, until the voter had indicated two choices. If the voter desires to change his vote he can simply press the button again, reilluminating the light which allows him to make another selection.

The specific structure of the voting machines, and its keyboard and switches are discussed in copending applications Ser. No. 543,392 filed Oct. 19, 1983 for "Portable Voting Booth", now U.S. Pat. No. 4,510,378 and 543,390 filed Oct. 19, 1983 for "Keyboard System and Module Therefore", now U.S. Pat. No. 4,559,427 which are incorporated by reference herein.

Figure 5:
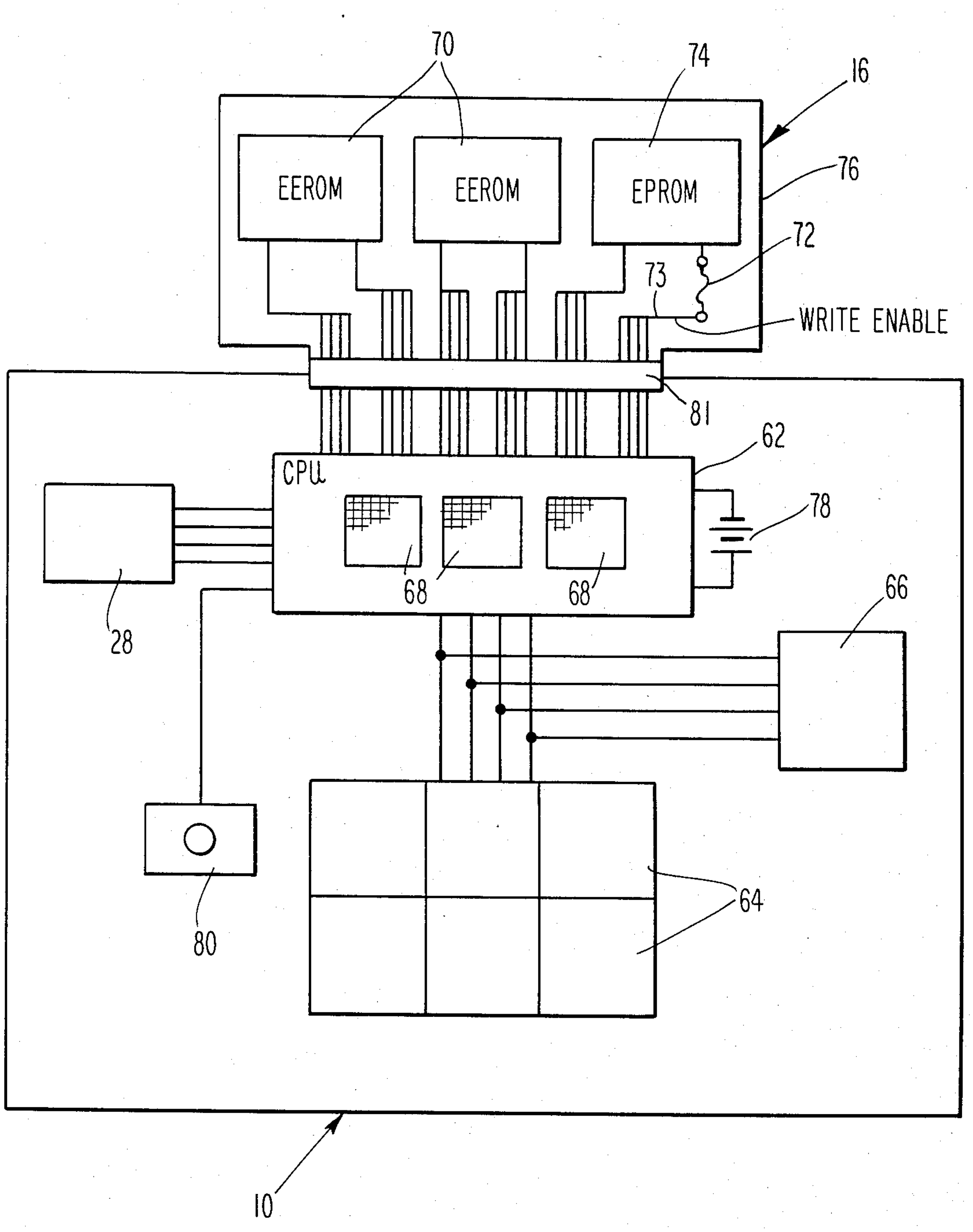
FIG. 5 is a view showing the more important components of the programmable voting machine of the invention, those of the programmable cartridge by which the voting machine is personalized by the computer prior to an election, and their interconnection.

FIG. 5 shows in block diagram form the essential parts of the electronic voting machine of the invention 10 and its interface to the memory cartridge 16. The heart of the electronic voting machine 10 is a central processing unit (CPU) 62 which in the preferred embodiment comprises a Hitachi Model HD6303P microprocessor which is a custom CMOS version of the very popular 6801 microprocessor. This CPU 62 is connected to the printer 28 shown in FIG. 1, to six substantially identical matrix modules 64 which make up the array 48 of switches actuated by the voters, and to a control module 66 which is a similar array of switches; however only one control module is provided per electronic voting machine. This module is used by the election officials at the polling place to control the voting machine 10. For example, in a primary election an election official indicates to the machine whether a given voter is Republican, Democrat or other by depressing the appropriate switch, so that the machine is enabled to ensure that the voter only votes for the correct candidates.

In the preferred embodiment of the invention the CPU 62 contains three identical memory arrays 68. These are set aside to contain the tallies of the votes cast for particular candidates. After having depressed the switches corresponding to all the candidates for which he or she desires to vote, the voter depresses a vote switch 80. A value of one is then added to the appropriate registers in each of the three memory arrays. They are then compared to one another. If all the tallies in each of the registers are the same, there are no errors. The CPU as shown is connected to the memory cartridge 16 at a multipin connector port 81; typically this is the same sort of connector used, for example, to connect ROM cartridges containing mass-marketed software to home computers. The memory cartridge 16 contains essentially three ROM's, two of which are electrically erasable ROM's (EEROM) 70, and one is an electrically programmable ROM (EPROM) 74. As will be understood by those skilled in the art EEROM's 70 are electrically erasable by the CPU 62 of the programmable voting machine 10 so that it can write new data therein, whereas the EPROM 74 can not be written to or have its contents altered until it has been erased by non-electronic means, most commonly by exposure of the EPROM to ultraviolet light for a stated period of time. Accordingly, when the three registers 68 of the CPU all agree as to the particular tallies after each voter votes, the contents are copied into one of the EEROM's 70. The comparison between all four versions of the data is then made and if all are identical, the data is similarly copied to the second EEROM 70. In this way running sums of the tallies cast for each candidate are kept in five different registers, and they are checked after each voter by the CPU. If an error occurs an error indication can be provided on the operator console 66, and if necessary a mechanic can be summoned. It will be noted that in this way the election is continuously audited, automatically, and that at all times, the tallies in cartridge 16 are known to be correct.

At the conclusion of the day's voting the tallies for each of the candidates are then copied from the CPU into the EPROM. Obviously this is only possible once per election day due to the fact that the EPROM can only be written to after having been erased. For further security, a fuse 72 in series with the WRITE ENABLE line 73 leading to the EPROM is blown by the CPU 62 after copying the data to the EPROM, preventing any further writing to the EPROM 74 from occurring. The two EEROM's 70, the EPROM 74 and the fuse 72 are all provided in a sealed opaque case 76 which cannot be opened without detection, so as to ensure security of the voting process. Preparation for an election involves assembly of new fuses 72 into memory cartridges 16, after having exposed the EPROM's 74 to ultraviolet light, so as to erase their contents. Cases 76 are then sealed and can not be altered by a human operator until after the election. The EEROM's are then programmed by the personal computer 20 with election data concerning the candidates, the offices and any legal restrictions, and are used to physically carry these signals to the voting machine 10 for supply to the CPU 62 for programming it. Additional details concerning the memory cartridge are found in copending application Ser. No. 608,159 filed May 8, 1984, incorporated herein by reference.

As shown at 78 the CPU is provided with battery backup so that the contents of the three registers 68 are not lost upon depowering of the voting machine at the end of the day. Present day battery technology is sure that these registers can be expected to retain the data without error for a period of many years. Accordingly, if the memory cartridge 16 and the results paper tape produced by printer 28 of FIG. 1 should be lost on its way back to the central polling place or otherwise be damaged or affected, an accurate tally of the results of the election is available and can be obtained by insertion of a special cartridge in the memory cartridge port 81, which would cause the data contained in the registers 68 to be written to the special memory cartridge. Similarly, this cartridge could contain instructions to print out the election data by way of printer 28; this printing of course will typically also be a function of the standard election day process.

It is believed that the programming and construction of the microprocessor 62 and of the matrix modules 64 are relatively straight forward and do not pose difficulty to those skilled in the art, inasmuch as the functions performed are basically simply association of a particular button with a particular register so as to keep an accurate tally of the number of times each button is pressed. In a preferred embodiment, each of the six matrix modules comprises a circuit board holding an array six columns wide and fourteen rows high of identical switches, constructed as discussed in the copending applications referred to and incorporated by reference above. Each matrix module 64 and the control module 66 includes a Motorola MC 146805G2 series microprocessor for control of the various functions required. The control module 66 is a similar circuit board and includes counters displaying the total number of voters, and a four digit LED display of error codes so as to enable any faults in the machine occurring at election day to be rapidly corrected by machine technicians. The control module or the CPU may also comprise a timer measuring the total amount of time voters are engaged in voting; kept over a period of time, such data can be useful in estimating the number of voting machines which should be assigned to a particular polling place on an election day. The electronic voting machine also comprises a vote button 80 attached to the CPU; when the voter has selected all the candidates he desires to vote for in a particular election, he simply presses this single button 80, at which time all the tallies are updated and checked one against the other.

Figure 6:
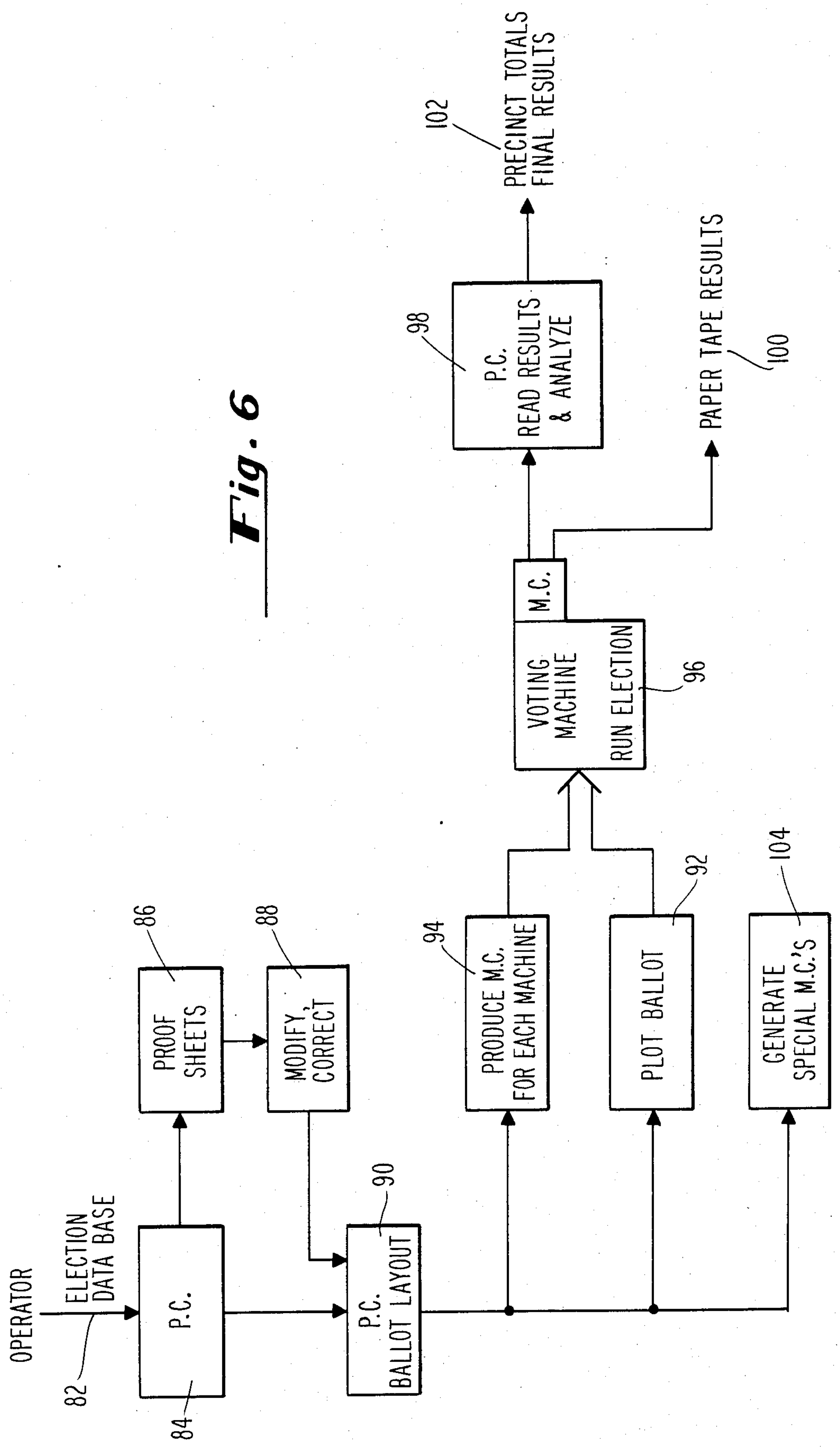
FIG. 6 shows a flowchart of the electoral process as carried out using the programmable voting machine of the invention.

FIG. 6 shows a flow chart of the operation of the electronic voting system of the invention. An election official or operator generates at 82 the election data base information concerning the offices, the eligible candidates, their parties, and any legal requirements which may be required. This data is input into a personal computer (PC) at 84. This then prints out proof sheets indicating the association of candidates with their offices and the like at 86, as indicated in connection with printer 26 in FIG. 1. These are modified and corrected as necessary at 88. The election officials lay out the ballot at 90. The ballots are then printed at 92, e.g. by printer 22 of FIG. 1, and memory cartridges (MC) 16 are produced at 94 by EPROM programmer/reader 14. These are then supplied to the voting machine at 96 and the election is run. After the polls close, the memory cartridges are returned to the personal computer at 98 along with the paper tape results at 100. The personal computer reads the results from the memory cartridge and then analyzes them as required. It outputs precinct totals and final results at 102. The personal computer can also generate special memory cartridge-compatible devices as at 104, e.g. to read the totals contained in the registers 68 of the CPU of the programmable voting machine of the invention in the event that the memory cartridge is lost.

FIG. 7 shows a way in which an absentee ballot may be arranged providing convenience for the voter, clarity of the voting process and great election security. The absentee ballot comprises a computer printed document having a number of instructions on its upper portion and provided with a number of removable bar coded labels bearing the names of the candidates for office 106, and bar codes 108 encoding the candidates' names, or encoded or numerical representations thereof, and a voter number. The voter selects the bar coded label corresponding to the candidate of his choice and pastes it on the left hand of the ballot at 112 as indicated. The absentee ballot is provided with a perforation 114 so that after having made his selections the voter is readily enabled to tear the ballot in half along the perforation 114 and throw the unused labels away. He then delivers the completed left hand portion of the absentee ballot to election headquarters, whereupon the bar code labels can be read by a typical bar code reader, as at 30 in FIG. 1. The throwing away of the unused labels together with the provision of the printed voter number encoded into the bar code on each label ensures a high degree of election security, because to counterfit the labels would require duplication of all labels and association with the correct ballot. Moreover, the art of labelling has advanced to the point that it is possible to provide a bar code label which can readily be removed from its position on the right hand part of the ballot but cannot be removed after having been pasted on the left hand part of the ballot without detection, such that corrupt election officials are prevented from removing labels bearing votes for candidates they do not support. It would also be possible to eliminate printing the candidates' names on the labels, making interference even more difficult. It will be appreciated by those skilled in the art that it will be a relatively simple matter to print these absentee ballots by computer printer 26 of FIG. 1 (using for example the Hewlett-Packard Model 2932A printer operated by the IBM PC computer), and that they can be similarly be used as emergency ballots in the event the electronic voting machines according to the invention break down; similarly, that inputting the data coded by the bar code labels to the computer can be accomplished readily.

It will be appreciated that there has been described an electronic voting system which is extremely versatile, which can be readily programmed, and which is adaptable to a wide variety of electoral conditions. It will furthermore be appreciated that while a preferred embodiment of the invention has been described, the invention is not to be limited thereby but only by the following claims.

What is claimed is:

1. An electronic voting system for use by voters in casting their votes during an election, comprising:

a computer system for receiving input data relating to offices contested, candidates for said offices and legal restrictions on voting for said offices, and at least one programmable voting machine, said computer system comprising:

means for inputting said data;

means for storage and manipulation of said data;

means for generating a ballot associating said candidates with their respective offices and indicating any such legal restrictions on voting for said candidates;

means for generating control signals for supply to said voting machine, said signals including information concerning said candidates and their respective offices and any legal restrictions on their running as well as a first checksum based upon said data;

programmable read-only memory means including erasable read-only memory means for transporting said signals to said voting machine and for redundantly tabulating the votes cast on said voting machine;

means for altering data stored in said erasable, read-only memory means upon the voter's having completed casting his votes in order to update a total votes cast for each of said candidates, whereupon said voting machine is adapted to program said erasable read-only memory means with new data indicative of said total votes cast; and means for generating a second checksum upon completion of the election, said second checksum based upon the total votes cast at the completion of the election and adapted to indicate an election security breach if said total votes cast does not agree with said second checksum;

said voting machine comprising:

an array of substantially identical switches, each of said switches upon actuation thereof indicating a vote cast; and means for effectively associating said switches with said candidates and with said offices upon supply to said voting machine of said control signals, such that on supply of said signals to said voting machine the voting machine is adapted from an unprogrammed state to a state in which it is programmed to redundantly record the results of a given election.

2. The system of claim 1 wherein said voting machine further comprises means for supplying the votes cast to said computer system for tabulation.

3. The system of claim 1 further comprising means for generating a plurality of absentee ballots.

4. The system of claim 1 wherein said read only memory means further comprises means for redundantly storing the votes cast on said voting machine and for supplying the same to said computer system for tabulation.

5. The system of claim 4 wherein said erasable read only memory means each comprise means for auditing the votes tabulated therein after each vote is cast.

6. The system of claim 5 wherein said auditing means comprises a plurality of registers in said voting machine for redundantly tallying the votes for each candidate, means for supplying said tallies to said erasable read only memory means and means for comparison of the tallies in said voting machine with those in the erasable read only memory means, wherein the tallies in said registers and the corresponding versions thereof in said erasable read only memory means are compared after each voter votes.

7. The system of claim 6 wherein said read only memory means further comprises:

first electrically erasable read only memory means for storage of updated election results upon voting by each voter and second non-electrically erasable read only memory, for storage of the final results of voting on a given voting machine.

8. The system of claim 7 wherein means are provided for prevention of writing of further data to said non-electrically erasable read only memory means after the final results of voting on a given programmable voting machine have been stored therein.

9. A programmable voting machine comprising:

a number of switches adapted to be individually actuated by a voter to indicate his votes cast;

means for associating names of candidates and of offices for which the candidates are running with respective ones of said switches;

means for receiving signals from a host computer to determine which of said switches are associated with corresponding candidates;

means for receiving ballot means for indicating to a voter that a particular switch is associated with a particular candidate;

means for redundantly maintaining tallies of votes cast for particular candidates including;

means for comparing said redundantly maintained tallies each with the other including means to disable said voting machine upon the occurrence of an unfavorable comparison; and means for outputting said favorable compared tallies to programmable read-only memory means at the conclusion of a period of voting.

10. The programmable voting machine of claim 9 wherein said receiving means further comprises:

microprocessor adapted to receive said signals from said host computer; and said signals being used to control said microprocessor means so as to associate individual ones of said switches with said candidates.

11. The programmable voting machine of claim 10 wherein said microprocessor means controls the contents of memory registers which store running tallies of the votes cast for each candidate.

12. The programmable voting machine of claim 11 wherein upon voting by each voter, the contents of said registers are updated, and the contents of each register are copied by said microprocessor means to memory registers comprised in removable memory cartridge means attached to said programmable voting machine and the tallies in said cartridge are compared to tallies in said programmable voting machine, to ensure security of accuracy of the voting process.

13. The programmable voting machine of claim 9 wherein visible indicator means are provided to prompt voters to vote for candidates for particular offices.

14. The apparatus of claim 13 wherein said visible indicator means comprises light emitting means juxtaposed to a readable indicator of the office for which the voter is eligible to vote.

15. The programmable voting machine of claim 14 wherein said light means is extinguished upon the voter having selected the appropriate number of candidates for the office.

16. The system of claim 9 wherein said programmable voting machine is provided with battery means for maintenance of tabulation of votes even after ordinary power to said machine has been disconnected such that the votes can be read at a later date.

17. The programmable voting machine of claim 9 wherein said voting machine further comprises printer means for outputting a printed visible record of the events of the day of election.

18. The programmable voting machine of claim 17 wherein said printed record comprises notations indicative of the opening and closing of the polls, or write in votes, and of any opening of or repairs to said programmable voting machine such that a permanent record of such events is made.

19. The programmable voting machine of claim 9 wherein said voting machine further comprises three substantially identical memory arrays operatively coupled together in said voting machine, each of said arrays adapted to contain individual tabulations of the votes cast for each of the candidates running in a particular election, the tabulations contained by each of said three arrays being compared one to the others, the comparison thereof, being further compared with tallies stored in corresponding memory arrays carried by a removable memory cartridge after each voter has completed voting, whereby running sums of the votes cast for each candidate are carried both within said memory cartridge and within the programmable voting machine.

20. The voting machine of claim 19 wherein said corresponding arrays in said cartridge to which the running sums contained by said array of said machine are compared are electrically erasable read only memories such that they are erased by the programmable voting machine prior to writing of additional votes therein.

21. The programmable voting machine of claim 20 wherein said memory cartridge additionally comprises said programmable read-only memory means, and said programmable read-only memory means is a non-electrically erasable read only memory into which the tallies of the votes cast for each of the candidates are copied at the conclusion of the voting on a given day.

* * * * *

UNITED STATES PATENT AND TRADEMARK OFFICE
CERTIFICATE OF CORRECTION

PATENT NO. : 4,641,240

DATED : February 3, 1987

INVENTOR(S) : Robert J. Boram

It is certified that error appears in the above-identified patent and that said Letters Patent is hereby corrected as shown below:

Column 6, line 14, please change "the" to --this--.

Column 8, line 11, please change "sure" to --such--.

Column 9, line 54, please delete the second occurrence of the word "be".

Signed and Sealed this

Twentieth Day of October, 1987

*Attest:*

DONALD J. QUIGG

*Attesting Officer*

*Commissioner of Patents and Trademarks*